No. 779,825. Patented January 10, 1905.

UNITED STATES PATENT OFFICE.

HEINRICH WELTZ, OF LUDWIGSHAFEN-ON-THE-RHINE, GERMANY, ASSIGNOR TO BADISCHE ANILIN UND SODA FABRIK, OF LUDWIGSHAFEN-ON-THE-RHINE, GERMANY, A CORPORATION.

ANTHRAQUINONE DYE AND PROCESS OF MAKING SAME.

SPECIFICATION forming part of Letters Patent No. 779,825, dated January 10, 1905.

Application filed October 8, 1903. Serial No. 176,292.

*To all whom it may concern:*

Be it known that I, HEINRICH WELTZ, doctor of philosophy and chemist, a subject of the King of Bavaria, residing at Ludwigshafen-on-the-Rhine, in the Kingdom of Bavaria, Empire of Germany, have invented new and useful Improvements in Anthraquinone Coloring-Matter and Processes of Making the Same, of which the following is a specification.

I have discovered that the polyhydroxy-anthraquinone sulfo-acid described in the specification of Letters Patent No. 754,264, March 8, 1904, which can be obtained by acting on anthraquinone-beta-mono-sulfo-acid with concentrated sulfuric acid, mercury or mercuric salts, and nitrous acid in the presence of arsenic acid or phosphoric acid, can be condensed with the sulfo-acids of aromatic amins, under which term I include the salts of such sulfo-acids, giving rise to new coloring-matters soluble in water. The condensation can be effected, for example, either in the presence or in the absence of water and with the addition or not of a condensation agent.

My new coloring-matter is distinguished by the following reactions: It is soluble in water, giving a red solution, which on the addition of ammonia or sodium carbonate becomes violet to reddish-blue. On the addition of caustic soda it becomes blue. Its solution in concentrated sulfuric acid (containing ninety-six [96] per cent. of $H_2SO_4$) is red and becomes violet-blue to blue-violet on the addition of boric acid. It is soluble in hot anilin, the coloring-matter of Example 1, yielding a violet solution.

The following examples will serve to further illustrate the nature of my invention; but it is not confined to these examples. The parts are by weight.

Example 1: Heat together in an autoclave for one (1) hour at a temperature of from two hundred to two hundred and five degrees centigrade (200°–205° C.) twenty (20) parts of the above-mentioned polyhydroxy-anthraquinone-sulfo-acid sodium salt, ten (10) parts of phosphoric anhydrid, and forty (40) parts of sodium sulfanilate, (equal to thirty-three [33] parts of sulfanilic acid.) The mass gradually becomes dark. Pour the reaction product into water, boil, and precipitate the coloring-matter by means of common salt. Filter and wash with a solution of common salt. The coloring-matter so obtained dyes unmordanted wool in bluish-red shades, chrome-mordanted wool in reddish-blue shades, and alumina-mordanted wool in violet shades.

Example 2: Dissolve in eighty (80) parts of water twenty (20) parts of the aforementioned polyhydroxy-anthraquinone-sulfo-acid sodium salt and forty (40) parts of sodium metanilate. Heat the mixture in an enameled autoclave for about one (1) hour at a temperature of about one hundred and seventy degrees centigrade, (170° C.) Work up the resulting product as explained in the foregoing Example 1. The coloring-matter dyes wool somewhat redder shades than does that obtained according to Example 1. In place of sulfanilic acid or metanilic acid other sulfo-acids of aromatic amido bodies can be employed.

I claim—

1. The process of manufacturing anthracene coloring-matter by condensing the hereinbefore-mentioned purpurin sulfo-acid with a sulfo-acid of an aromatic amido body.

2. The process of manufacturing anthracene coloring-matter by condensing the hereinbefore-mentioned purpurin sulfo-acid with metanilic acid.

3. The new coloring-matter such as can be obtained by condensing together the hereinbefore-mentioned purpurin sulfo-acid and a sulfo-acid of an aromatic amido body, which is soluble in hot anilin and hot water giving with the latter a red solution which on the addition of ammonia, or sodium carbonate, becomes violet to reddish-blue, whose solution in concentrated sulfuric acid is red, becoming on the addition of boric acid violet-blue to blue-violet, which dyes unmordanted wool bluish-red shades and chrome-mordanted wool reddish-blue shades.

4. The new coloring-matter such as can be obtained by condensing together the hereinbefore-mentioned purpurin sulfo-acid and metanilic acid, which dissolves in hot water with a red color, which color on the addition of ammonia, or sodium carbonate, becomes violet, whose solution in concentrated sulfuric acid is red and becomes on the addition of boric acid violet-blue, and which dissolves in hot anilin yielding a violet solution.

In testimony whereof I have hereunto set my hand in the presence of two subscribing witnesses.

HEINRICH WELTZ.

Witnesses:
ERNEST E. EHRHARDT,
J. ALEC. LLOYD.